May 24, 1927.
H. A. STEWART ET AL
1,629,550
CLUTCH CONTROL FOR TRACTORS
Original Filed April 1. 1925   2 Sheets-Sheet 1
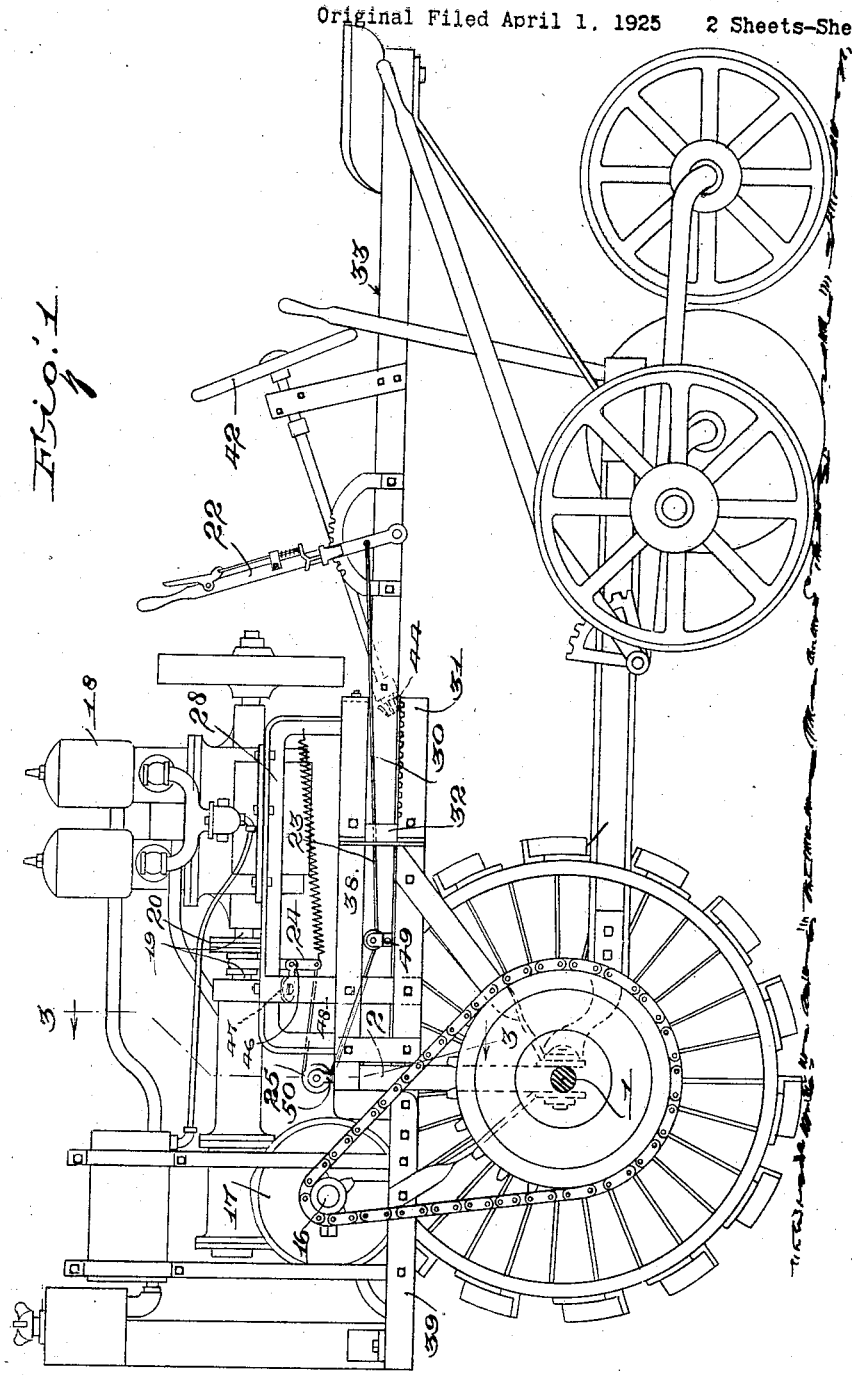
WITNESSES
INVENTOR
Henry A. Stewart
Frank L. Holt.
BY
ATTORNEYS

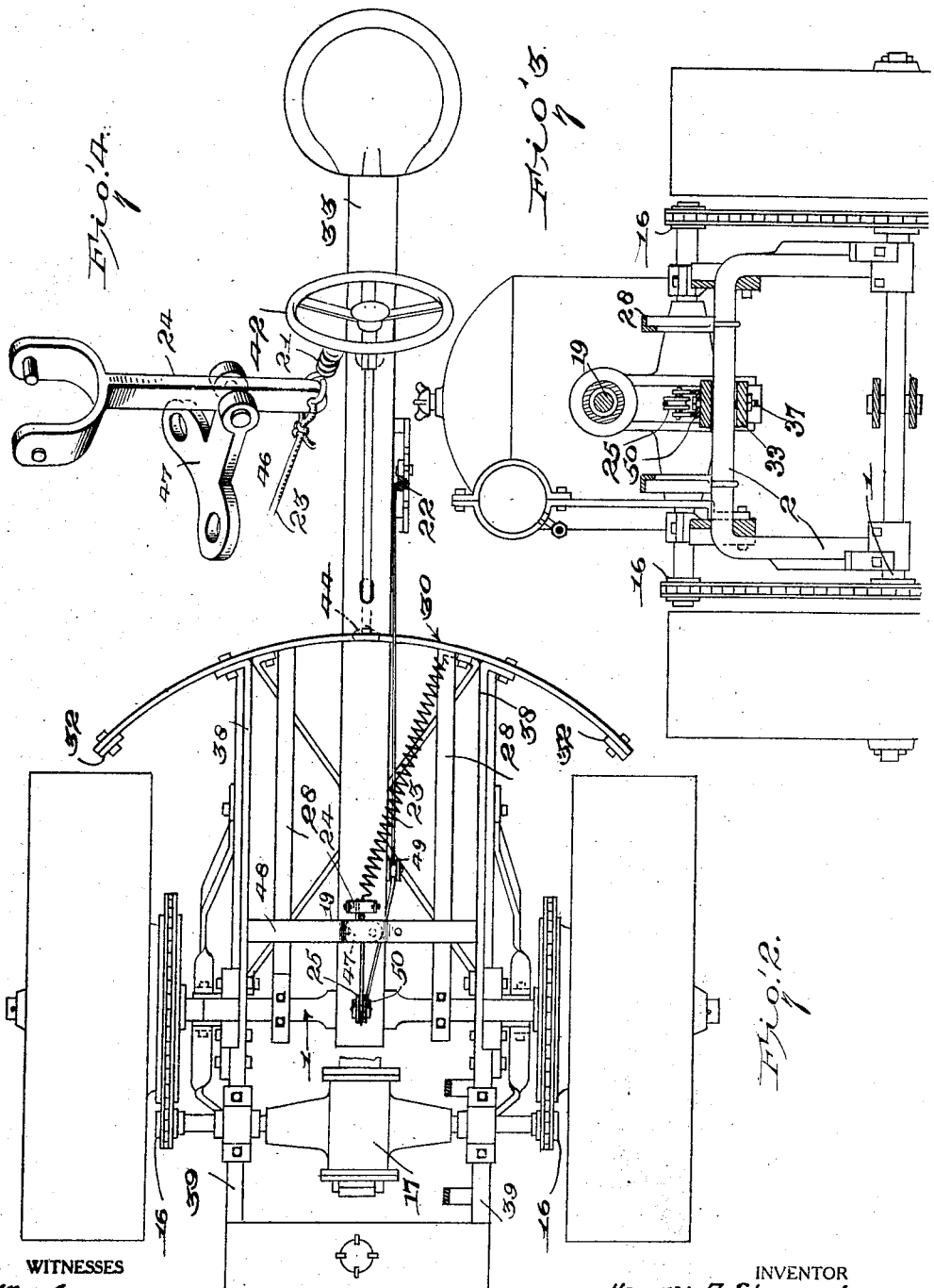

Patented May 24, 1927.

1,629,550

UNITED STATES PATENT OFFICE.

HENRY ALONZA STEWART AND FRANK LENARD HOLT, OF TULLAHOMA, TENNESSEE.

CLUTCH CONTROL FOR TRACTORS.

Original application filed April 1, 1925, Serial No. 19,978. Divided and this application filed March 23, 1926. Serial No. 96,808.

This invention relates to improvements in farm tractors, more specifically in the clutch control therefor, and it consists of the constructions, combinations and arrangements herein described and claimed.

An object of the invention is to provide a flexible connection between the clutch lever on the coupling bar of a tractor and the clutch arm on the turntable frame which carries the engine, permitting pivotal movement of the turntable frame in respect to the coupling bar without interfering with the operation or control of the clutch.

Other objects and advantages appear in the following specification, reference being had to the accompanying drawing, in which Figure 1 is a side elevation of a farm tractor illustrating the improved clutch control, Figure 2 is a plan view, Figure 3 is a detail cross section taken substantially on the line 3—3 of Figure 1, Figure 4 is a detail perspective view of a portion of the clutch arm, and the bracket which pivotally supports it.

This application is a division of our co-pending application for Letters Patent on tractors, filed April 1, 1925, Serial #19,978, now Patent No. 1,578,479 and as already indicated, the specific improvement resides in the clutch control. The arrangement is such that control of the clutch may be had even though the turntable frame, which carries the engine and clutch, may be disposed at various positions in respect to the coupling bar of the tractor.

The one-piece axle 1 is bent in the shape of an inverted U to provide an arch 2 upon which the coupling bar 33 is pivotally mounted by means of a king bolt 37. The arch carries a framework upon which a suitable internal combustion engine 18 is mounted. The engine has a drive shaft 19 by which suitable gearing in the differential case 17 is driven.

The driving power of the engine is controlled by a disk clutch 20 which normally is held inoperative by a spring 21. A clutch lever 22, pivotally mounted upon the coupling bar 33 within reach of the driver, has a flexible connection 23 which reaches to the clutch arm 24, a rearward pull upon the lever producing a pull on the flexible connection, and a rocking of the arm 24 against tension of the spring 21 so that the clutch 20 is rendered operative to transmit power to the differential shaft 16 and so to the wheels of the tractor. The driving connections between the wheels and the differential shaft are shown.

A pin 46 or the like constitutes the pivotal mounting for the clutch arm 24 upon a bracket 47 which is bolted to that part 48 of the frame that crosses the machine and curves under the drive shaft and housing.

The turntable frame comprises an arcuate yoke 30 and a quadrant 31, one being situated above the coupling bar 33, the other below (Fig. 1). The extremities of these elements are connected by bars 32. Pairs of bars 38 and 39 are connected with the elements 30 and 31, the frame portion 48 being connected with the first pair as shown in Figure 2.

It is clear that when the pinion 44 is turned by means of the hand wheel 42 the entire framework or turntable frame must move by virtue of the engagement of the pinion with the quadrant 31. The framework includes a pair of yokes 28 (Fig. 1) upon which the engine 18 is mounted. One extremity of the spring 21 is fastened to one of these yokes.

In order that control of the clutch 20 may be had during the foregoing turning of the framework, the flexible element 23, which may be a cable, chain or the like, is trained over pulleys 25 and 49 before it reaches its place of connection with the clutch arm 24. The bracket 50 of the pulley 25 is mounted upon the king bolt 37 (Fig. 3) so that the pulley may be in axial alinement with the pivotal connection of the framework with the coupling bar.

The operation is readily understood. Turning of the hand wheel 42 produces turning of the turntable frame 30, 31 and the entire framework depending upon the arch 2 for support. This turning occurs in respect to the coupling bar 33. The clutch 20 is capable of control by the driver even though the turntable frame be turned at an angle either to the right or left of the coupling bar 33. The necessity for such control is obvious because the driver may find it necessary to stop and start the tractor while a turn is being made.

A pull upon the clutch lever 22 to the rear produces a forward pull upon the clutch arm 24 so that the plates of the clutch 20 are engaged and the driving power of the engine 18 transmitted to the tractor wheels. The engagement of the clutch is maintained by the engagement of the clutch lever detent with the customary quadrant. Upon moving the lever 22 in the reverse direction the resulting relaxation of the flexible element 23 permits the spring 21 to rock the arm 24 rearwardly to disengage the clutch.

Inasmuch as the pulley 25 is located upon the pivotal connection 37 of the framework with the coupling bar 33 any necessary relative turning of the framework can be accomplished without interfering with the operation of the clutch or with the operation of the clutch lever 22. Any tendency toward a slight tightening of the flexible element 23 upon turning of the framework may be compensated for by a slight play in the flexible element, but in practice the tendency to tighten the element is so slight that it is not to be considered.

While the construction and arrangement of the improved clutch control as herein described and claimed is that of a generally preferred form, obviously modifications and changes may be made without departing from the spirit of the invention or the scope of the claim.

We claim:—

A tractor comprising a framework, wheels, an engine having a drive shaft, means for transmitting the engine driving power to the wheels including a clutch, a coupling bar with which the framework has pivotal connection; in combination, an arm having an upper forked end to engage the clutch for operation, a bracket secured to part of the frame work having portions receiving the arm below said fork to provide a pivotal mounting for the arm, a lever for rocking the arm upon said pivotal mounting being mounted upon the coupling bar, a flexible element connecting the lever with the arm at a point below the pivotal mounting a spring connected at the same point and extending to a point of fastening upon the frame work, and a plurality of guide means over which the flexible element is trained, one of said guide means being located in axial alinement with the pivotal connection of the framework permitting pivotal movement thereof without interfering with the operation of said arm in the actuation of the clutch.

HENRY ALONZA STEWART.
Mr. FRANK LENARD HOLT.